Patented Oct. 11, 1927.

1,645,275

UNITED STATES PATENT OFFICE.

ALBERT BEYLER, OF MANNHEIM-NECKARAU, GERMANY, ASSIGNOR TO RHEINISCHE GUMMI- UND CELLULOID-FABRIK, OF MANNHEIM-NECKARAU, GERMANY.

MANUFACTURE OF DOLLS AND PARTS THEREOF FROM CELLULOSE DERIVATIVES.

No Drawing. Application filed September 29, 1926, Serial No. 138,570, and in Germany October 19, 1925.

This invention relates to the manufacture of dolls and component parts from celluloid or other cellulose derivatives, and its object is to produce such articles in colours that really simulate the natural flesh tints of human beings, and more particularly of human beings whose skins are naturally white or whitish.

Dolls' heads, dolls' limbs and the like have hitherto suffered from a defect which could not be overcome even in the case of porcelain and other materials, namely, the shiny and wax-like appearance of the colour intended to imitate the tint of white or whitish human skin but quite unlike this latter.

Attempts have long been made in the ceramic industry to make porcelain resemble white or whitish human skin by the incorporation of suitable pigments, but without any great success, and the various endeavours to imitate nature by the aid of celluloid material may also be regarded as failures.

A great variety of methods have been proposed for accomplishing the ultimate result or effect accomplished by this invention by means of which the skin of the doll is made a somewhat transparent and cream-like white with a greenish tint that is somewhat accentuated but at the same time subdued by bloodish red coloring matter which unites with the green tint and produces a natural, healthful rosy effect that is distinctly new in the cellulosic doll head and member art. For example, transparent celluloid has been taken and painted on the outside or inside. White celluloid has been employed and attempts made to produce a flesh tint by lacquering, dipping, etc., but always with the same lack of success. Finally, the practice was adopted of simply incorporating the flesh tint colouring with the celluloid composition, a method which is still in general use but which nevertheless gives rise to the aforesaid defect.

My invention, however, produces a colouration that corresponds exactly to the tint of white or whitish human flesh or skin. It is based upon the discovery that blood-reddish colouring matter will produce the soft and delicate hue or bloom of white or whitish human skin when applied to a specially tinted background, namely, a cellulose derivative of cream-white colour having a greenish tinge. By using a semi-transparent celluloid having the required creamy colour and greenish tinge, an effect of reflection is produced which enables the flesh tint of a white or whitish human body to be truly reproduced in all its modifications.

In carrying the invention into practice, a white pigment and a small proportion of green colouring matter are first incorporated with the celluloid or cellulose derivative to produce a composition having a greenish tinted foundation which gives the foundation material the somewhat green color of a corpse of the white race, and then the blood-like colouring matter is applied thinly, preferably by spraying in order to effect a relatively dull or non-shiny, cream-like and rosy skin of the white or whitish race; the superposed, blood-like, reddish coloring matter, mentioned below, coacting with the underlying, greenish surface of the foundation material to produce the natural somewhat dull and non-shiny, healthy appearance of a natural creamy and rosy skin. The composition initially prepared as stated has the ashen greenish appearance of the flesh of a corpse of the white race, and it is a singular if unexpected fact that the application of the reddish colour thereto results in a most lifelike hue quite unlike the waxen appearance of dolls as heretofore manufactured, but substantially identical with the actual hue or bloom created by human blood flowing beneath human skin of the racial type above indicated.

The following is an example of the preparation of the greenish white composition now preferred:

About 100 parts of nitro cellulose, acetyl cellulose, or a suitable cellulose derivative, are mixed with about 30 parts of camphor, camphor substitute or other suitable gelatinizing agent, and there is added about 1.5 parts of white pigment (zinc white; white lead or the like) together with about 0.03 parts of greenish colour which may be either metal green, mineral green or aniline green examples of all of which are well known.

The blood-like substance to be applied consists of blood red colouring matter dissolved in alcohol, benzine, benzol, ether, acetic acid or other known solvent. It is sprayed on to the moulded composition with a fine spraying apparatus, an essential condition being that it penetrates completely into and adheres intimately to the composition. The thickness of the coating of red blood colouring matter applied may be varied in parts to imitate different aspects of flesh, such as rosy cheeks.

The blood-like or reddish coloring matter consists of red aniline color but may be made of cinnabar or native red sulphide mercury or red earth color and the like. The red aniline color or other coloring matter just referred to may be combined with small quantities of white pigment such as zinc white, for instance, together with a little yellow earth color; such, for examples, as yellow ochre, yellow aniline color, chrome color and the like.

The addition of the white coloring material and yellow coloring material to said foundation material, and of the blood-like coloring matter may be varied, according to the will of the manufacturer, to effect variations in the complexion of the particular skin to be formed on the doll's head or other member by penetration into and adherence of the superposed, reddish coloring matter on the greenish or ashen green basic foundation material of which the doll head or doll member is molded. The blood-red surface or red dye or red color may be made lighter or darker as preferred. The finished skin forming material is permanently colored and washable and free from the shiny or wax-like appearance which has heretofore characterized colored cellulosic material.

The impregnation of the base or foundation creamy-white and greenish tinted material by the blood-red material effects a permanently adhesive superficial surface giving the doll head and particularly the face, a novel physical, characteristic condition and appearance strikingly resembling that of a healthy, natural, creamy-white and rosy complexion, that is such a complexion as is frequently referred to as "a peaches and cream complexion."

In comparison with more or less analogous colored doll heads and faces heretofore made, in which the exposed surfaces are noticeably and positively shiny, the corresponding surfaces effected by this invention are relatively dull and very natural.

Nevertheless it is to be said that by this invention, when and if more of a yellowish or brownish coloring matter is added to the greenish tinted or tinged foundation material, doll heads and members of the positively brunette or dark skinned races may be obtained. In all instances, the bloodish red coloring matter modifies the greenish tinted or tinged foundation material and if more or less yellowish or brownish coloring matter be added to the greenish foundation material, the blood red coloring matter effects in the completed product a skin having the physical characteristic of a natural, healthy human skin having a human blood foundation.

The creamy white, greenish tinted foundation material has a waxy appearance and physical characteristic. This waxy physical characteristic of the foundation material is positively changed, molecularly in all probability, by its impregnation with the bloodish-red coloring matter with the result that the finished product, which is a hardened composition, is given the distinctly different and novel physical characteristic of natural healthy human skin. The quantity of said bloodish-red coloring matter which is either incorporated in or sprayed on the foundation material is in its nature variable but is in all cases small relatively to the mass of the finished composition.

The process of manufacture herein described can be applied both to finished dolls' heads, component parts etc., (which is preferable), and to the raw material which is afterwards formed into such articles. Modifications can be introduced in respect of combined colours by making the green-tinged cream-white colour of the composition a little less green and somewhat redder, browner, etc. at the same time, and by lightening the imitation blood colouring to a corresponding extent. In this way it is easily possible to imitate the flesh tint of humans of different races and types.

In conclusion, I desire to emphasize that the mixture and proportion of colours herein given is by way of example and that the invention is not limited to the same, as the proportion of the different colours and the colours themselves may be varied within wide limits without departing from the scope of the invention as defined by the following claims.

Having now fully described my invention what I claim and desire to secure by Letters Patent is:—

1. The herein described process of manufacturing dolls and component parts from cellulose derivatives in colors which simulate the natural flesh tints of human beings, said process comprising forming a creamy-white, greenish tinged, wax-like foundation of cellulose derivatives; and in coloring the outer surface of said foundation material with an impregnating blood-like coloring matter, thereby destroying the wax-like appearance of said foundation material and converting said wax-like material superficially into a relatively dull condition resembling that of natural, healthy human skin.

2. The herein described process of manufacturing dolls and component parts from cellulose material in colors which simulate the natural flesh tints of human beings, said process comprising forming a creamy-white, greenish tinged, wax-like foundation of cellulose derivatives; and spraying the outer surface of said foundation material with an impregnating, blood-like coloring matter thereby destroying the wax-like appearance of the foundation material and converting said wax-like composition superficially into a relatively dull condition resembling that of natural, healthy human skin.

3. The herein described article of manufacture for use in the manufacture of dolls, component parts thereof and other articles in simulation of natural flesh tints, said article including a creamy-white, greenish tinged, wax-like foundation of cellulose derivatives modified by a reddish coloring matter effective to destroy such waxy characteristic and to give to a surface of the finished composition a relatively dull physical condition resembling that of natural healthy human skin.

4. The herein described article of manufacture which comprises a foundation made from about 100 parts of cellulosic derivatives; 30 parts of a gelatinizing agent; 1.5 parts of white pigment; 0.03 parts of green coloring material, substantially such as described; modified by a bloodish-red color, substantially such as described, in a relatively small quantity sufficient for converting the creamy-white, green tinged wax-like foundation into a non-waxen surface condition and to give to a surface of the foundation the physical characteristic of natural, healthy human skin.

In testimony whereof I affix my signature.

ALBERT BEYLER.